United States Patent
Bono

(10) Patent No.: US 7,993,789 B2
(45) Date of Patent: Aug. 9, 2011

(54) FUEL CELL SYSTEM AND GAS CONTROL METHOD

(75) Inventor: Tetsuya Bono, Nishikamo-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 12/929,477

(22) Filed: Jan. 27, 2011

(65) Prior Publication Data

US 2011/0123885 A1     May 26, 2011

Related U.S. Application Data

(63) Continuation of application No. 10/566,385, filed as application No. PCT/IB2004/004112 on Dec. 14, 2004.

(30) Foreign Application Priority Data

Dec. 15, 2003   (JP) ................................. 2003-416445

(51) Int. Cl.
*H01M 8/04* (2006.01)

(52) U.S. Cl. ........ 429/444; 429/428; 429/429; 429/430; 429/432; 429/443

(58) Field of Classification Search .......... 429/428–430, 429/432, 443, 444
See application file for complete search history.

(56) References Cited

U.S. PATENT DOCUMENTS 6,815,107 B2   11/2004   Inai et al.

FOREIGN PATENT DOCUMENTS

| EP | 1 414 091 A2 | 4/2004 |
|----|----|----|
| JP | 06150952 A * | 5/1994 |
| JP | A 06-150952 | 5/1994 |
| JP | A 09-27336 | 1/1997 |
| JP | A 11-73983 | 3/1999 |
| JP | A 2002-352837 | 12/2002 |

OTHER PUBLICATIONS

Apr. 19, 2005 International Search Report issued in International Application No. PCT/IB2004/004112.

* cited by examiner

*Primary Examiner* — Jerry Lorengo
*Assistant Examiner* — Jared Wood
(74) *Attorney, Agent, or Firm* — Oliff & Berridge, PLC

(57) ABSTRACT

A fuel cell system including a fuel cell that generates electricity through an electrochemical reaction between a fuel gas and an oxidizing gas is provided with a gas supply unit that supplies each of the fuel gas and the oxidizing gas to an anode and a cathode of the fuel cell, respectively by quantity corresponding to a load, a gas permeation quantity estimation unit that estimates a gas permeation quantity of at least one of the fuel gas and the oxidizing gas between the anode and the cathode after the power generation performed by the fuel cell is stopped, and a correction unit that corrects a supply quantity of at least one of the fuel gas and the oxidizing gas each corresponding to the load in accordance with the estimated gas permeation quantity, which is to be supplied by the gas supply unit upon a subsequent start of power generation.

8 Claims, 4 Drawing Sheets

FUEL CELL SYSTEM AND GAS CONTROL METHOD

This is a continuation of application Ser. No. 10/566,385, filed Jan. 30, 2006, which is a National Stage Application of PCT/IB04/04112, filed Dec. 14, 2004, and claims the benefit of Japanese Patent Application No. 2003-416445, filed Dec. 15, 2003. The entire disclosures of the prior applications are hereby incorporated by reference in their entirety.

BACKGROUND OF THE INVENTION

1. Field of the Invention

The invention relates to a fuel cell system that generates electricity through an electrochemical reaction between fuel gas and oxidizing gas and a gas control method of the fuel cell system.

2. Description of the Related Art

A fuel cell is structured to start power generation upon supply of the fuel gas and the oxidizing gas. The fuel cell generates required electric energy in response to the supply of the fuel gas and the oxidizing gas by quantity each corresponding to a required load.

The operation of the aforementioned fuel cell is interrupted by stopping the supply of the fuel gas and the oxidizing gas. For example, the power generation may be completely stopped by introducing inactive gas into the fuel cell (pressurizing) or sucking the residual fuel gas outside (generating negative pressure) so as to be discharged outside.

Meanwhile in the case where the vehicle equipped with the fuel cell is stopped for a short period of time or operated under low loads, the supply of the fuel gas and the oxidizing gas is stopped while having the fuel gas and the like remained in the fuel cell.

In the fuel cell, the fuel gas is separated from the oxidizing gas with a polymer electrolyte. If such gas is left in the state where the power generation (electrochemical reaction) is interrupted, the gas is likely to permeate through the polymer electrolyte until partial pressure of each gas at both electrodes becomes equal. The above-described permeation of the gas through the polymer electrolyte may interfere with normal power generation, resulting in a temporal deterioration in the performance of the fuel cell (output voltage) upon re-start of the power generation.

Japanese patent application Publication No. JP-A-2002-352837 discloses a fuel cell system that swiftly supplies excessive fuel gas into the fuel cell under pressure applied upon activation such that power output is obtained quickly from the stopped state of the fuel cell.

In the case where the power generation (electrochemical reaction) has been stopped, the fuel gas and the oxidizing gas both separated by the polymer electrolyte in the fuel cell tend to permeate therethrough until the partial pressures at both electrodes become equal. The above-described permeation of such gas may interfere with normal power generation, thus temporarily deteriorating the performance (output voltage) of the fuel cell upon re-start thereof. If the excessive gas under high pressure is swiftly supplied into the fuel cell repeatedly at every re-start of the fuel cell as aforementioned, a very thin solid polymer electrolyte or catalytic electrode may be damaged and the fuel gas is wasted, thus deteriorating the fuel efficiency.

SUMMARY OF THE INVENTION

It is an object of the invention to provide a fuel cell that overcomes the problem of the deterioration in its performance upon re-start of power generation while avoiding deterioration in the fuel efficiency.

First aspect of the invention relates to a fuel cell system provided with a fuel cell that generates electricity through an electrochemical reaction between a fuel gas and an oxidizing gas, and a load device which is supplied with electric power from the fuel cell, the fuel cell system includes a gas supply unit that supplies each of the fuel gas and the oxidizing gas to an anode and a cathode of the fuel cell, respectively by quantity corresponding to a load; a gas permeation quantity estimation unit that estimates a gas permeation quantity of at least one of the fuel gas and the oxidizing gas between the anode and the cathode after the power generation performed by the fuel cell is stopped; and a correction unit that corrects a supply quantity of at least one of the fuel gas and the oxidizing gas each corresponding to the load in accordance with the estimated gas permeation quantity, which is to be supplied by the gas supply unit upon a subsequent start of power generation.

According to the first aspect of the invention, the above-described structure makes it possible to overcome reduction in the effective catalytic area owing to formation of water drop on the catalytic surface resulting from chemical short-circuit caused by the residual gas in the fuel cell that permeates through the polymer electrolyte between the anode and the cathode after interruption of the fuel cell operation, or the delay in the rise of the fuel cell upon re-start thereof owing to reduction in the gas pressure in the anode and the cathode.

In the first aspect of the invention, the gas permeation quantity may be estimated based on a drop rate of an open circuit voltage after the power generation performed by the fuel cell is stopped. Such estimation may be made using the correlation between the reduction rate in the open circuit voltage and the gas permeation quantity through the polymer electrolyte at a predetermined elapse of time after interruption of the fuel cell operation.

In the aspect related to the first aspect of the invention, the drop rate of the open circuit voltage may be calculated based on an amount of a voltage drop that has occurred between the anode and the cathode due to a leakage of the fuel gas to the cathode and a leakage of the oxidizing gas to the anode after the power generation performed by the fuel cell is stopped, an elapsed time from when the power generation performed by the fuel cell is stopped, and a function which has been obtained through experiment or simulation calculation preliminarily.

In the first aspect of the invention, the gas permeation quantity may be estimated based on a gas pressure decrease rate in the fuel gas after the power generation performed by the fuel cell is stopped. Such estimation may be made using the correlation between the reduction rate in gas pressure within the fuel cell and the gas permeation quantity through the polymer electrolyte at a predetermined elapse of time after interruption of the fuel cell operation.

In the aspect related to the first aspect of the invention, the gas pressure decrease rate may be calculated based on the estimated gas permeation quantity which has been obtained through experiment or simulation calculation preliminarily based on a fuel gas pressure in the anode after the power generation performed by the fuel cell is stopped, a decrease in the fuel gas pressure for an elapsed time from when the power generation performed by the fuel cell is stopped until when the power generation performed by the fuel cell is restarted, and the elapsed time.

In the first aspect of the invention, the correction unit independently may set each of a correction amount of the fuel gas and a correction amount of the oxidizing gas based on the estimated gas permeation quantity.

In the first aspect of the invention, the gas permeation quantity estimation unit independently may estimate each of the gas permeation quantity of the fuel gas and the gas permeation quantity of the oxidizing gas.

According to the first aspect and related aspect of the invention, the fuel cell may be brought into a stopped state in an intermittent operation mode of the fuel cell. The fuel cell provided in the vehicle is structured to supply electricity from a secondary battery in the low load state such as a vehicle stopped state for improving the fuel efficiency such that the fuel cell is briefly stopped until its operation is needed. The fuel cell has to be started quickly as higher electric energy is required to allow the vehicle to take off. According to the aspect of the invention, the deterioration in the start-up characteristic of the fuel cell caused by permeation of the gas may be avoided by correcting the quantity of the supplied gas, thus improving the take-off characteristic of the vehicle.

Second aspect of the invention relates to a gas control method of a fuel cell system including a fuel cell that generates electricity through an electrochemical reaction between a fuel gas and an oxidizing gas, and a load device which is supplied with electric power from the fuel cell, the method includes the steps of: supplying each of the fuel gas and the oxidizing gas to an anode and a cathode of the fuel cell, respectively by quantity corresponding to a load; estimating a gas permeation quantity of at least one of the fuel gas and the oxidizing gas between the anode and the cathode after the power generation performed by the fuel cell is stopped; and correcting a supply quantity of at least one of the fuel gas and the oxidizing gas corresponding to the load in accordance with the estimated gas permeation quantity, which is to be supplied upon a subsequent start of power generation.

The invention makes it possible to avoid drop in the output voltage immediately after re-start of the fuel cell. The quantity of the gas supplied upon re-start of the fuel cell is adjusted (corrected) to an appropriate value so as to improve the rise-up characteristic of the output voltage. Accordingly this makes it possible to avoid damage in the solid polymer electrolyte under the excessive pressure or the deterioration in the fuel efficiency upon excessive supply of the fuel gas.

DETAILED DESCRIPTION OF THE PREFERRED EMBODIMENTS

Figure 1:
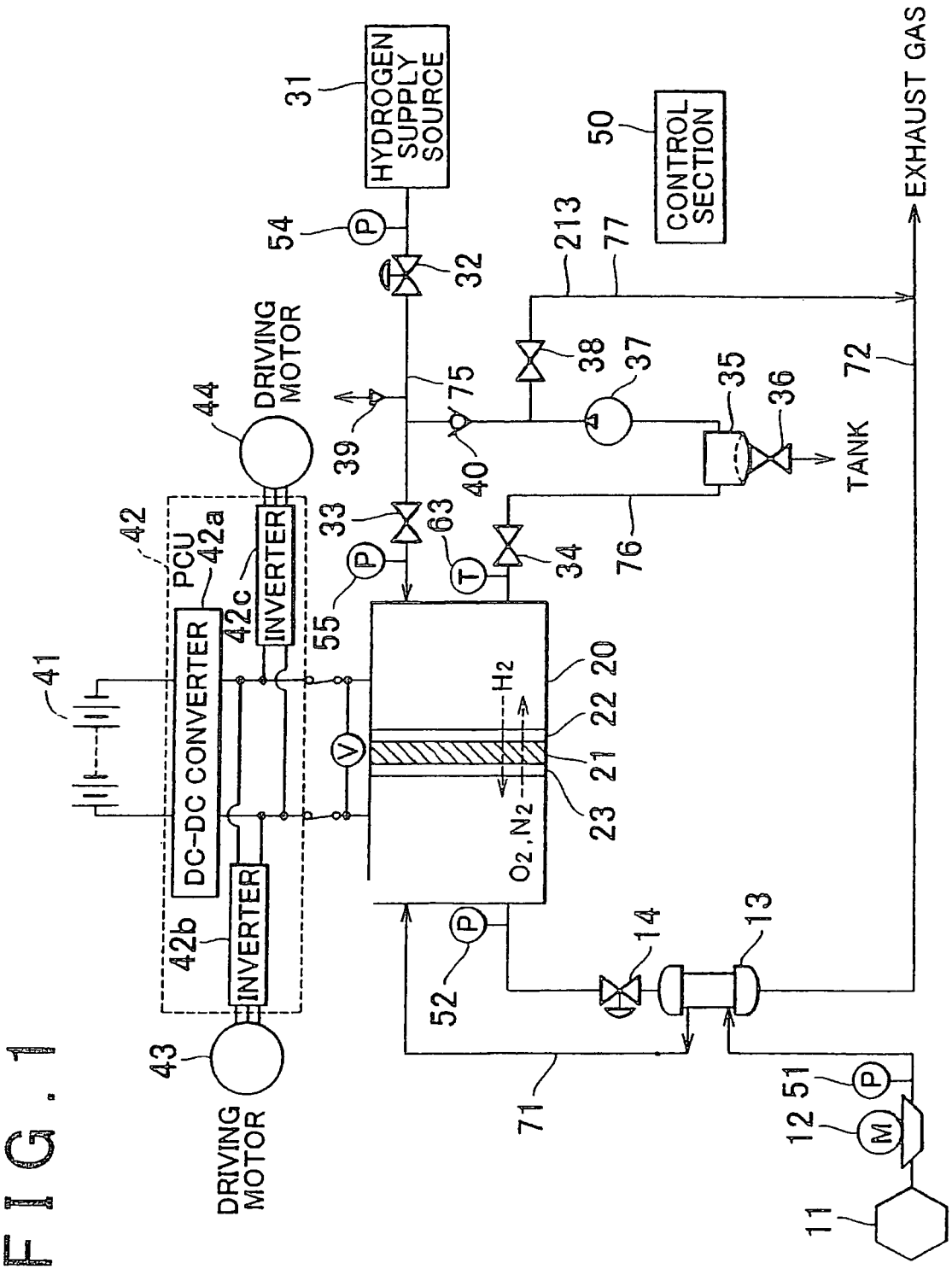
FIG. 1 is an explanatory view that represents a structure of a fuel cell system according to the invention.

Preferred embodiments of the invention will be described referring to the drawings.

A fuel cell system according to the invention is structured to estimate the fuel gas permeation quantity from the anode to the cathode, and the permeation quantity of the oxidizing gas and the inactive gas from the cathode to the anode, respectively in a non-power generation state of the fuel cell that has stopped power generation upon suspension of supply of at least one of the fuel gas and the oxidizing gas. If it is determined that the gas permeation quantity is large, the quantity of circulation and supply of the fuel gas, and supply quantity of the oxidizing gas are increased for the subsequent start of the fuel cell (start of power generation). Accordingly the density of the fuel gas upon the re-start of the fuel cell is increased so as to cope with the flooding state of the produced water or to dilute the fuel gas that has permeated to the cathode such that the rise-up performance (power generation performance) of the output voltage upon subsequent start of the power generation may be assured.

The gas permeation quantity may be estimated using the reduction rate (reducing speed) of the open circuit voltage (OCV) of the fuel cell, the reduction rate of the fuel gas pressure of the anode, and other parameters of the fuel cell operation, which relate to the gas permeation quantity.

FIG. 1 is a block diagram that represents a first embodiment of the invention. In the first embodiment, an open circuit voltage V of the fuel cell having its operation interrupted is observed, and a leakage of the fuel gas to the cathode is estimated in accordance with the state where the open circuit voltage V is reduced. The leakage of the oxidizing gas to the cathode is also estimated. The fuel gas may be hydrogen gas, and the oxidizing gas may be air (containing oxygen, nitrogen and the like), for example. In the case where chemical short-circuit or reduction in the gas pressure owing to permeation of the fuel gas and the oxidizing gas is estimated, the gas by the quantity corresponding to the correction amount is added to correspond each quantity of the fuel gas and the oxidizing gas supplied upon next activation to the required load such that start-up characteristic of the fuel cell is improved.

Referring to FIG. 1, a fuel cell 20 includes a solid polymer electrolyte 21 disposed between an anode 22 and a cathode 23 (MEA: Membrane Electrode Assembly), to which a plurality of unit cells each provided with a gas supply passage (not shown) and a cooling water passage (not shown) are stacked. Air (outside air) as the oxidizing gas is supplied to an air inlet of the fuel cell 20 via an air supply passage 71. The air supply passage 71 includes an air filter 11 that removes particles from air, a compressor 12 that pressurizes air, a pressure sensor 51 that detects an air supply pressure, and a humidifier 13 that adds a predetermined quantity of moisture to air. The air filter 11 is provided with an air flow meter that detects the flow rate of air.

Air off-gas discharged from the fuel cell 20 is further discharged outside through an exhaust passage 72. The exhaust passage 72 is provided with a pressure sensor 52 that detects an exhaust pressure, a pressure regulator valve (flow control valve) 14 and a heat exchanger of the humidifier 13. The pressure regulator valve 14 serves as a pressure regulator that sets the pressure of air (air pressure) supplied to the fuel cell 20. Each of the detection signals (not shown) from pressure sensors 51, 52 is transmitted to a control section 50. The control section 50 sets the air supply pressure or supply flow rate by regulating the compressor 12 and the pressure regulator valve 14. The compressor 12, the pressure regulator valve 14 and control program of the control section 50 constitute a unit that supplies the oxidizing gas.

The hydrogen gas functioning as the fuel gas is supplied from a hydrogen supply source 31 to a hydrogen supply inlet of the fuel cell 20 via a fuel supply passage 75. The hydrogen supply source 31 may be formed as a high-pressure hydrogen tank, hydrogen storing alloy, reformer and the like. The fuel supply passage 75 is provided with a pressure sensor 54 that detects a pressure of the hydrogen supply source, a pressure regulator valve (flow control valve) 32 that regulates the pressure of the hydrogen gas supplied to the fuel cell 20, a relief valve 39 that opens when the fuel supply passage 75 is under the abnormal pressure, a shut-off valve 33 that opens and closes the hydrogen gas supply inlet of the fuel cell, and a pressure sensor 55 that detects a pressure of the inlet of the hydrogen gas. The pressure sensor 55 may be formed as the gas pressure detection unit. The signals (not shown) of the pressure sensors 54 and 55 are supplied to the control section 50. The control section 50 sets the supply quantity of the hydrogen gas by regulating the pressure regulator valve 32.

The hydrogen gas that has not been consumed by the fuel cell 20 is discharged into a hydrogen circulation passage 76 as hydrogen off-gas so as to be returned to the downstream side of the pressure regulator valve 32 in the fuel supply passage 75. The hydrogen circulation passage 76 is provided with a temperature sensor 63 that detects a temperature of the hydrogen off-gas, a shut-off valve 34 that discharges the hydrogen off-gas, a gas/liquid separator 35 that recovers water from the hydrogen off-gas, an exhaust valve 36 through which the recovered water is collected in the tank (not shown), a hydrogen pump 37 that pressurizes the hydrogen off-gas, and a check valve 40. The shut-off valves 33 and 34 may be formed as elements for closing the anode side of the fuel cell. The detection signal (not shown) of the temperature sensor 63 is supplied to the control section 50. Operations of the hydrogen pump 37 are controlled by the control section 50. The hydrogen off-gas flows to be mixed with the hydrogen gas supplied from the hydrogen supply source 31 in the fuel supply passage 75 such that the mixture is supplied to the fuel cell 20 and re-used therein. The hydrogen gas supplied to the fuel cell 20 includes the new hydrogen gas from the hydrogen supply source 31 and the circulated hydrogen gas. The check valve 40 serves to prevent back flow of the hydrogen gas in the fuel supply passage 75 into the hydrogen circulation passage 76. The hydrogen supply source 31, the pressure regulator valve 32, and the hydrogen pump 37 constitute the fuel gas supply unit. The aforementioned oxygen gas supply unit and the fuel gas supply unit constitute the gas supply unit.

The hydrogen circulation passage 76 is connected to the exhaust passage 72 through a purge passage 77 via a purge valve 38. The purge valve 38 is formed as an electromagnetic shut-off valve, which is operated upon a command from the control section 50 so as to release (purge) the hydrogen off-gas outside. The aforementioned purging is performed intermittently for circulation within the fuel cell repeatedly such that the hydrogen off-gas with increased impurity content is discharged outside. Then the new hydrogen gas is introduced for the purpose of preventing decrease in the voltage in the cell. The discharged hydrogen off-gas is diluted with air off-gas in a combustor (not shown) so as to be discharged outside.

A power control unit (PCU) 42 is connected to an output terminal of the fuel cell 20 via a switch. The power control unit 42 includes a DC-DC converter 42a that converts DC voltage, and inverters 42b, 42c that convert direct current into alternate current. The converter 42a serves to charge a secondary battery 41 at an appropriate voltage level corresponding to outputs of the fuel cell 20. The output of the secondary battery 41 is regulated to an appropriate level so as to be supplied to an accessory motor 43 and a driving motor 44 via the inverters 42b and 42c. The inverters 42b and 42c serve to supply outputs of the fuel cell 20 or the secondary battery 41 to the accessory motor 43 and the driving motor 44. The route of power supply by the power control unit 42 is controlled by the control section 50 in accordance with the operation mode. A voltmeter V is connected between output terminals of the fuel cell 20 and the monitor outputs are supplied to the control section 50.

The control section 50 receives inputs of a required load represented by not shown vehicle accelerator signals, control information transmitted from sensors of the respective portions in the fuel cell system and the like so as to control operations of various types of valves and motors. The control section 50 is formed of a control computer system (not shown) that may be structured with a well known commercially available system.

The operations of the control section 50 will be described referring to the flowchart shown in FIG. 2. The control section 50 is formed of a computer for the purpose of executing control as aforementioned. More specifically, the control section 50 controls operations of various portions in the fuel cell system in accordance with the control program (not shown).

The control section 50 interrupts operation of the fuel cell 20 and operates the secondary battery 41 for power supply in the low load state where power generation efficiency (fuel efficiency) of the fuel cell 20 is decreased, for example, stopped state of the vehicle. When the state of charge of the secondary battery 41 is lowered or the load is increased, the control section 50 serves to operate the fuel cell 20 for the purpose of supplying power to the load and charge the secondary battery 41. When charging of the secondary battery 41 is completed and the load is decreased, the operation of the fuel cell 20 is interrupted, and the power is supplied to the load by the secondary battery 41. The control section 50 according to this embodiment, the aforementioned operation is repeatedly performed in the low load state so as to perform intermittent operation of the fuel cell 20. (intermittent operation mode)

In step S20, the control section 50 establishes predetermined conditions, that is, continuing the stopped state of the vehicle during operation of the fuel cell system or continuing the low load state so as to execute the above-described intermittent operation mode.

Then in step S22, the control section 50 opens the switch of the output terminal of the fuel cell 20. The control section 50 then operates the power control unit 42 to supply power from the secondary battery 41 to power source of the accessory motor 43, the driving motor 44 and the like. In step S24, the respective supply systems for supplying the fuel gas and the oxidizing gas such as the air compressor 12, the hydrogen pump 37 and the like are stopped so as to interrupt the operation of the fuel cell 20. Operations of the shut-off valves 33 and 34 are stopped. In step S26, the control section 50 reads an open circuit voltage (OCV) V1 at a time y1 at which the operation of the fuel cell 20 is interrupted based on the output of the voltmeter V. The control section 50 then stores the read data in an inner memory (not shown). In step S28, the control section 50 observes whether the load requirement that exceeds a predetermined value in the intermittent operation mode has been generated or whether the request for re-generation of power in response to reduction in the state of charge of the secondary battery 41 has been generated. If NO is obtained in step S28, that is, re-generation of power has not been required, the non-power generation state of the fuel cell 20 is continued.

If YES is obtained in step S28, that is, re-generation of power has been required after an elapse of the time t1 from the moment at which the operation of the fuel cell 20 is interrupted, the control section 50 detects the open circuit voltage V2 of the fuel cell 20 at that time y2 and the detected voltage V2 is stored in the inner memory in step S30.

Figure 3A:
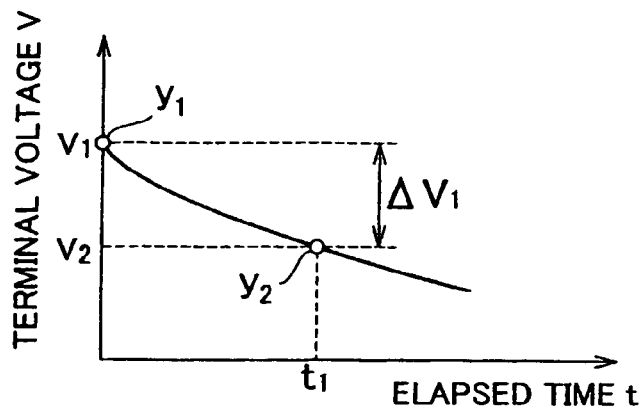
FIG. 3A is a graph that represents an example of an open circuit voltage of the fuel cell.
Figure 3B:
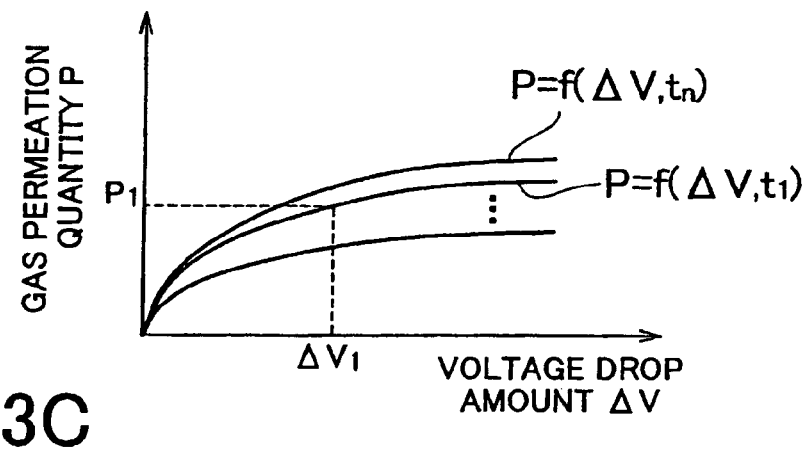
FIG. 3B is a graph that represents a relationship between the voltage drop and quantity of permeating gas.

The control section 50 estimates the gas permeation quantity during a period at which the operation of the fuel cell 20 is interrupted. Referring to FIG. 3A, if resumption of power generation is required at the time t1 after the interruption, the voltage drop rate is obtained by the equation of $\Delta V/t1=V1-V2/t1$. In step S32, the gas permeation quantity P is estimated using the function of $P=f(\Delta V, t)$ obtained experimentally or by performing simulation calculation preliminarily using parameters of the voltage drop amount $\Delta V$ and the elapsed time t1 as shown in FIG. 3B. The above estimation is made by focusing on the phenomenon that the voltage generated in the anode and the cathode drops owing to the leakage of the hydrogen gas sealed in the anode 22 into the cathode 23, and the leakage of the oxygen gas and the nitrogen gas from the cathode 23 to the anode 22. The process in step S32 corresponds to the gas permeation quantity estimation unit.

In step S34, it is determined whether the estimated gas permeation quantity P exceeds a reference value (threshold value), which may require correction. If YES is obtained in step S34, that is, the estimated value exceeds the threshold value, each quantity of the hydrogen gas supplied to the anode 22 and air supplied to the cathode 23 is increased. The amount of increase in the gas quantity N1 corresponding to the gas permeation quantity P1 is obtained using the function of the gas increase quantity $N=s(P)$ which has been obtained through experiment or simulation calculation preliminarily. The gas increased by the increase in the gas quantity N1 corresponding to the gas permeation quantity is added to each of the supply quantity of the hydrogen gas and air (gas supply quantity during the normal operation) in accordance with the required load so as to set the respective supply gas quantity in step S36. The process in step S36 corresponds to the correction unit.

If NO is obtained in step S34, that is, the estimated gas permeation quantity does not exceed the threshold value, which may not require the correction, the process proceeds to step S38 where each quantity of the hydrogen gas supplied to the anode 22 and air supplied to the cathode 23 is set to the quantity in accordance with the required load, respectively.

Then in step S40, the control section 50 regulates the pressure regulator valve 32 and the hydrogen pump 37 such that the supply quantity of hydrogen gas becomes the set value, and the shut-off valves 33, 34 are opened to start supply of the hydrogen gas. The air compressor 12 is activated to adjust the pressure regulator valve 14 such that the supply quantity of air becomes the set value. When the output voltage of the fuel cell 20 rises to a predetermined level upon supply of gas, the control section 50 functions in closing the switch to be connected to the power control unit 42. As aforementioned, correction of the gas supply quantity upon re-start makes it possible to allow rise-up of the output voltage at the reduced time lag. The control section 50 controls the power control unit 42 to stop power supply from the secondary battery 41 to the loads 43, 44 such that the power generated by the fuel cell 20 is supplied to those loads in step S42. The secondary battery 41 may be charged by the fuel cell 20 in case of necessity.

In step S44, the fuel cell 20 that has been interrupted in the intermittent operation mode is resumed to the operative state.

In the aforementioned embodiment, the gas permeation quantity is obtained as the amount of the voltage drop for the elapsed time t. It may be estimated as the decrease $\Delta p$ in the anode gas pressure. More specifically, the hydrogen gas pressure p1 at the anode 22 after closing of the shut-off valves 33, 34 and the hydrogen gas pressure p2 upon re-start of the fuel cell 20 are detected to derive the decrease $\Delta p$ in the gas pressure for the elapsed time t1 from the equation of $\Delta p=p1-p2$. The gas permeation quantity P in accordance with the decrease in the gas pressure $\Delta p$ and the elapsed time t may be derived from the equation that has been preliminarily prepared through experiment or simulation calculation, that is, $P=g(\Delta p, t)$.

In the aforementioned embodiment, each quantity of supply of the hydrogen gas (anode gas) and air (cathode gas) upon re-start is corrected. However, the supply quantity of any one of the anode gas and the cathode gas may be corrected.

Figure 4A:
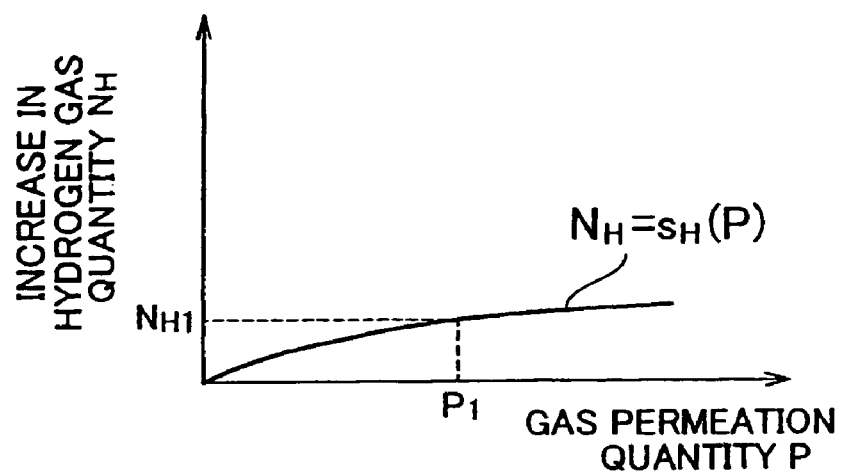
FIG. 4A is a graph that represents a function that determines an increase in quantity of hydrogen gas.
Figure 4B:
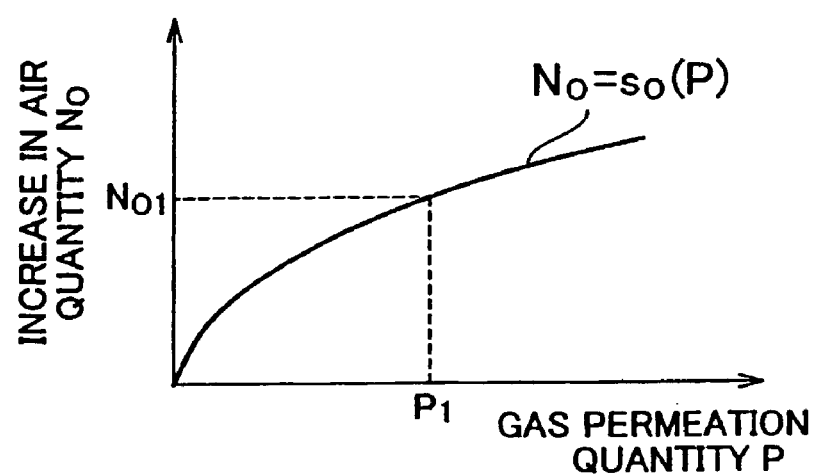
FIG. 4B is a graph that represents a function that determines an increase in quantity of air.

A second embodiment will be described referring to FIG. 4. The structure of the fuel cell system shown in FIG. 1 and control process shown in the flowchart of FIG. 2 are identical to those in the second embodiment. Accordingly, characteristic of the second embodiment different from that of the first embodiment will be described.

Figure 2:
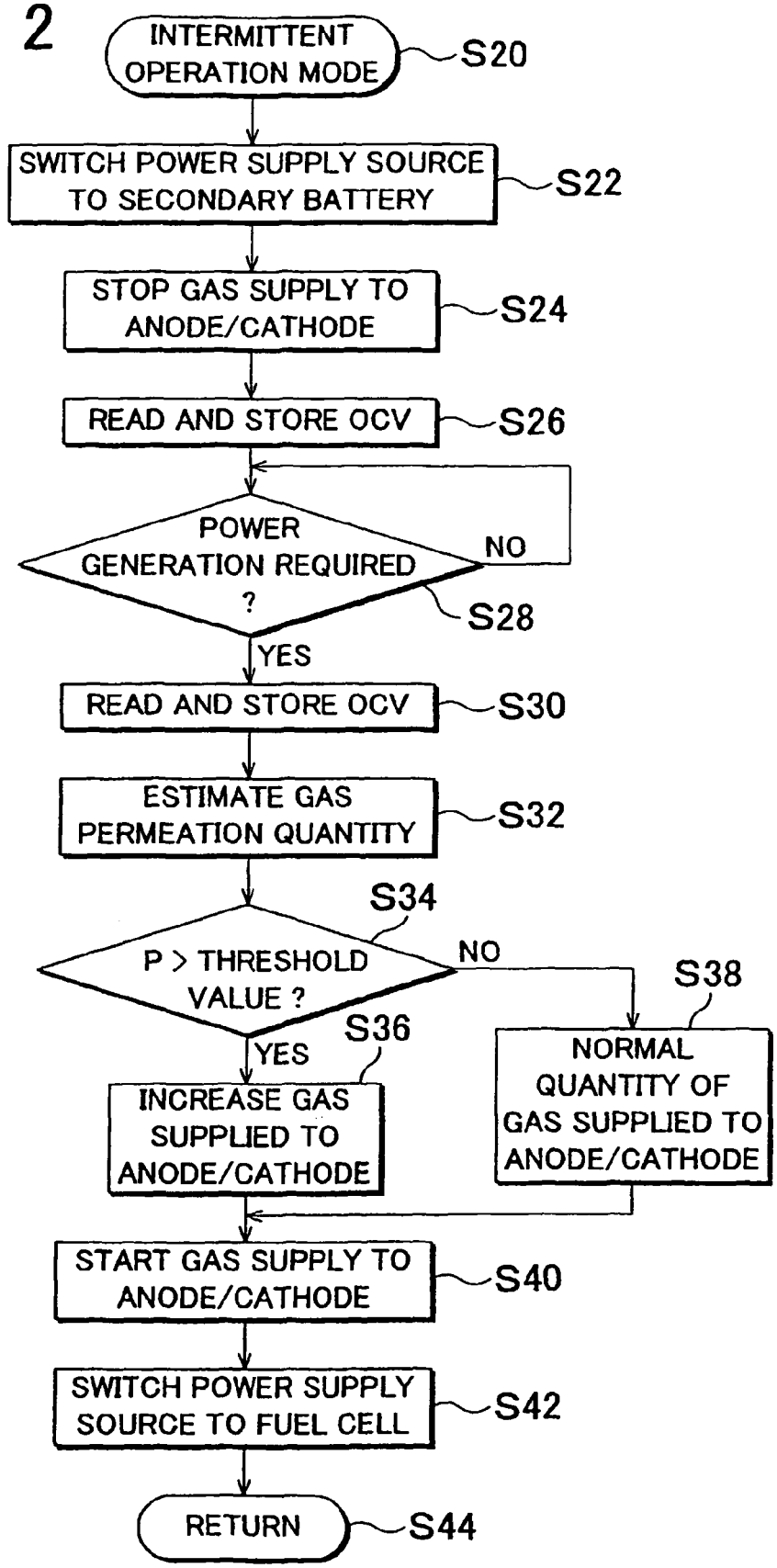
FIG. 2 is a flowchart that represents a control process to which the invention is applied upon an intermittent operation of the fuel cell.
Figure 3C:
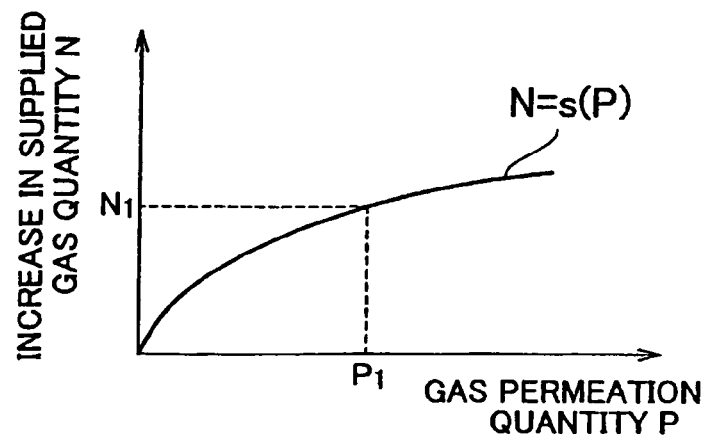
FIG. 3C is a graph that represents a relationship between the quantity of permeating gas and correction amount of the supplied gas.

In the first embodiment, each of the corrected quantities of the hydrogen gas and air with respect to the estimated gas permeation quantity is equal (see step S36 in FIG. 2 and FIG. 3C). In step S36 of the control routine executed by the control section 50 in the second embodiment, however, each of the corrected quantities of the hydrogen gas and air with respect to the estimated gas permeation quantity P1 is different. That is, the increase in the hydrogen gas $N_{H1}$ with respect to the gas permeation quantity P1 is derived from the hydrogen gas increase function $N_H=s_H(P)$ adapted to the hydrogen gas in reference to the estimated gas permeation quantity P1. The aforementioned function $N_H=s_H(P)$ is obtained through experiment or simulation calculation. Likewise, the increase in air $N_{O1}$ with respect to the gas permeation quantity P1 is derived from the air increase function $N_O=s_O(P)$ adapted to air in reference to the estimated gas permeation quantity P1. The aforementioned function $N_O=s_O(P)$ is obtained through experiment or simulation calculation.

In the second embodiment, each correction quantity of the hydrogen gas (fuel gas) and air (oxidizing gas) upon re-start of the fuel cell is independently set. This makes it possible to compensate the start-up characteristics more accurately.

In the first and the second embodiments, the gas permeation quantity P based on the voltage drop amount $\Delta V$ is estimated using the function $f(\Delta V, t)$. In a third embodiment, each gas permeation quantity is estimated by the fuel gas and the oxidizing gas, respectively. More specifically, the hydrogen gas permeation quantity $P_H$ corresponding to the voltage drop $\Delta V$ (voltage drop rate) for a predetermined time t may be obtained appropriately using the function $f_H(\Delta V, t)$ for estimating the hydrogen gas permeation quantity $P_H$. Meanwhile, the air permeation quantity $P_O$ corresponding to the voltage drop $\Delta V$ (voltage drop rate) for a predetermined time t may be obtained appropriately using the function $f_H(\Delta V, t)$ for estimating the air permeation quantity $P_O$. As described in the second embodiment, the hydrogen gas increase function $N_H=S_H(P)$ is used to obtain the increase in the hydrogen gas $N_H(=S_H(P_H))$ corresponding to the hydrogen gas permeation quantity $P_H$. Meanwhile, the air increase function $N_O=s_O(P)$ is used to obtain the increase in air $N_O(=s_O(P_O))$ corresponding to the air permeation quantity $P_O$.

In the third embodiment, gas permeation quantities, that is, the hydrogen gas (fuel gas) permeation quantity and air (oxidizing gas) permeation quantity are estimated. The correction quantity of the hydrogen gas upon re-start of the fuel cell is set based on the hydrogen gas permeation quantity. The correction quantity of air is set based on the air permeation quantity. As the above-described setting is performed with respect to the hydrogen gas (fuel gas) and air (oxidizing gas) independently, the start-up characteristics may be compensated with higher accuracy.

The functions used in the aforementioned embodiments may be replaced by a table of data where arguments and output values are stored. It is to be understood that the invention is not limited to be applied upon re-start of the fuel cell in the intermittent operation mode. It is also clear that the application of the invention upon re-start of the fuel cell from the interrupted state may prevent deterioration in the start-up characteristics of the fuel cell caused by cross leakage of gas.

The invention claimed is:

1. A gas control method of a fuel cell system including a fuel cell that generates electricity through an electrochemical reaction between a fuel gas and an oxidizing gas, and a load device that is supplied with electric power from the fuel cell, comprising:
   supplying each of the fuel gas and the oxidizing gas to an anode and a cathode of the fuel cell, respectively, by quantity corresponding to a load of the load device;
   estimating a gas permeation quantity of at least one of the fuel gas and the oxidizing gas between the anode and the cathode after power generation performed by the fuel cell is stopped; and
   correcting a supply quantity of at least one of the fuel gas and the oxidizing gas corresponding to the load in accordance with the estimated gas permeation quantity that is to be supplied upon a subsequent start of power generation.

2. The gas control method of claim 1, wherein the estimated gas permeation quantity is estimated based on a drop rate of an open circuit voltage after the power generation performed by the fuel cell is stopped.

3. The gas control method of claim 2, wherein the drop rate of the open circuit voltage is calculated based on (1) an amount of a voltage drop that has occurred between the anode and the cathode due to a leakage of the fuel gas to the cathode and a leakage of the oxidizing gas to the anode after the power generation performed by the fuel cell is stopped, (2) an elapsed time from when the power generation performed by the fuel cell is stopped, and (3) a function which has been obtained through experiment or simulation calculation preliminarily.

4. The gas control method of claim 1, wherein the estimated gas permeation quantity is estimated based on a gas pressure decrease rate in the fuel gas after the power generation performed by the fuel cell is stopped.

5. The gas control method of claim 4, wherein the gas pressure decrease rate is calculated based on a predetermined estimated gas permeation quantity which has been obtained through experiment or simulation calculation preliminarily based on (1) a fuel gas pressure in the anode after the power generation performed by the fuel cell is stopped, (2) a decrease in the fuel gas pressure for an elapsed time from when the power generation performed by the fuel cell is stopped until when the power generation performed by the fuel cell is restarted, and (3) the elapsed time.

6. The gas control method of claim 1, wherein, each of a correction amount of the fuel gas and a correction amount of the oxidizing gas based on the estimated gas permeation quantity are independently set.

7. The gas control method of claim 1, wherein, each of the gas permeation quantity of the fuel gas and the gas permeation quantity of the oxidizing gas are independently estimated.

8. The gas control method of claim 1, wherein the power generation performed by the fuel cell is brought into a stopped state in an intermittent operation mode of the fuel cell.

* * * * *